No. 791,098. PATENTED MAY 30, 1905.
A. JOHNSTON.
SASH PULLEY.
APPLICATION FILED DEC. 22, 1903.

2 SHEETS—SHEET 1.

Attest:
R. G. Orwig
N. W. Winters

Inventor
Allen Johnston
by J. L. Stewart Atty.

No. 791,098. PATENTED MAY 30, 1905.
A. JOHNSTON.
SASH PULLEY.
APPLICATION FILED DEC. 22, 1903.

2 SHEETS—SHEET 2.

Attest:
R. C. Orwig.
N. W. Winters.

Inventor
Allen Johnston
by J. E. Swett Atty.

No. 791,098.

Patented May 30, 1905.

UNITED STATES PATENT OFFICE.

ALLEN JOHNSTON, OF OTTUMWA, IOWA.

SASH-PULLEY.

SPECIFICATION forming part of Letters Patent No. 791,098, dated May 30, 1905.

Application filed December 22, 1903. Serial No. 186,243.

*To all whom it may concern:*

Be it known that I, ALLEN JOHNSTON, a citizen of the United States of America, and a resident of Ottumwa, Wapello county, Iowa, have invented a new and useful Sash-Pulley, of which the following is a specification.

The object of this invention is to provide means whereby a relatively large bearing may be produced at a minimum cost for material, thus giving a large wearing-surface, decreasing the friction between contacting parts, and strengthening a sash-pulley through the employment of the large bearing of material length.

A further object of this invention is to provide a hollow axle for a sash-pulley whereby sufficient strength may be attained at a minimum expense for material.

A further object of this invention is to provide a hollow axle for sash-pulleys whereby the maximum diameter of axle and maximum extent of wearing-surface between contacting parts may be attained at a minimum of expense for material.

A further object of this invention is to provide means for automatically lubricating contacting points between rotating members of a sash-pulley either by centrifugal feeding of lubricant or centripetal feeding thereof.

A further object of this invention is to provide a roller-bearing sash-pulley embodying a large wearing-surface at a minimum expense for material through the use of a hollow axle as distinguished from a solid axle.

My invention consists in the construction, arrangement, and combination of elements hereinafter set forth, pointed out in my claims, and illustrated by the accompanying drawings, in which—

Figure 1:
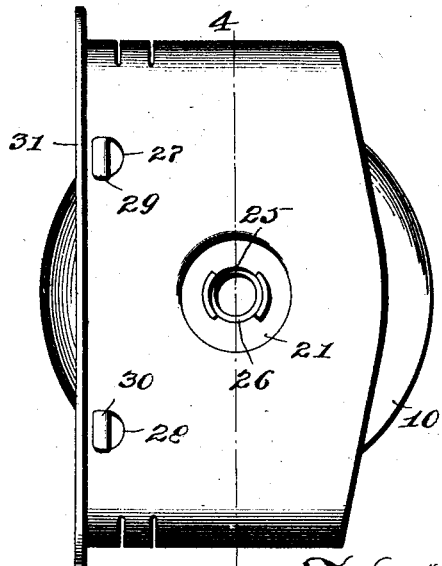
Figure 2:
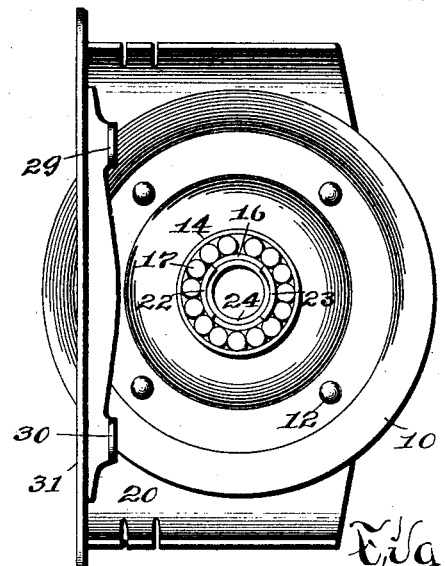
Figure 3:
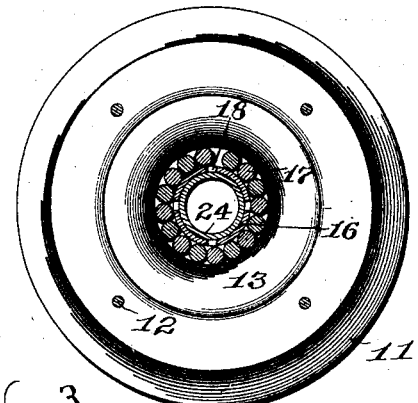
Figure 4:
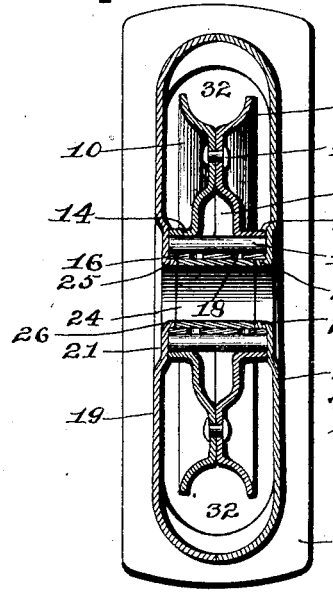
Figure 5:
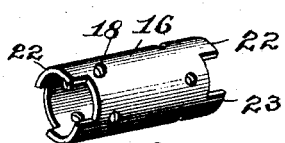
Figure 6:
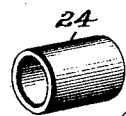
Figure 7:
Figure 8:
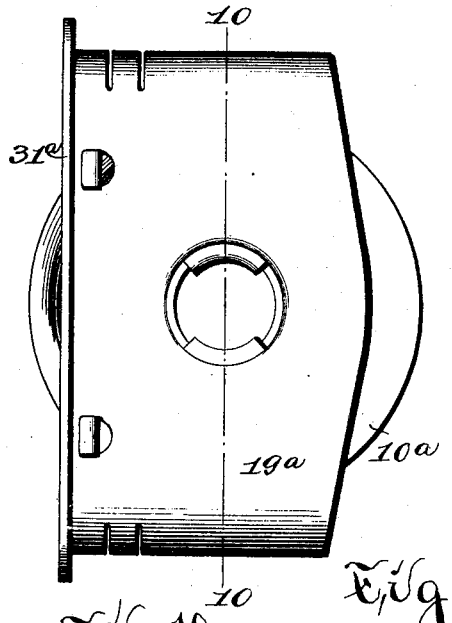
Figure 9:
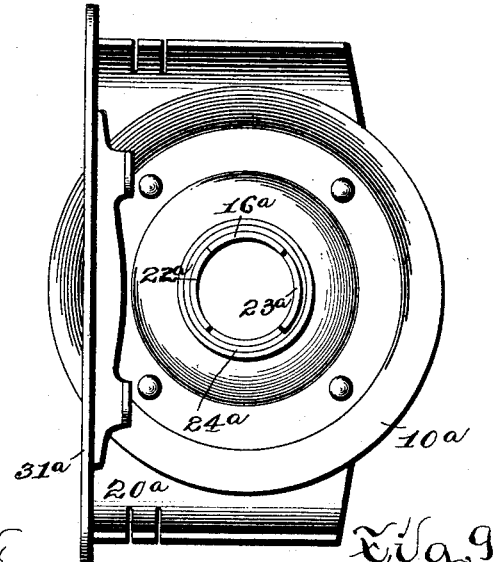
Figure 10:
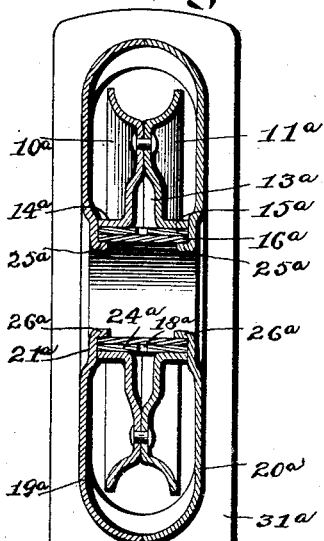
Figure 11:
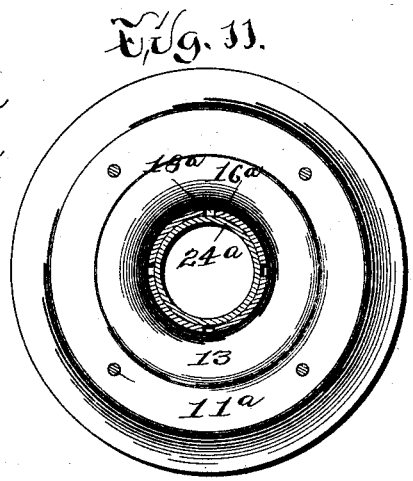
Figure 14:
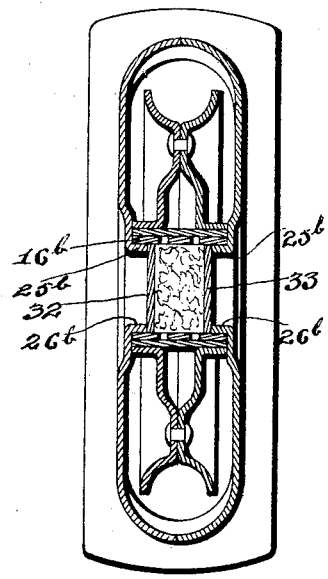
Figure 12:
Figure 13:
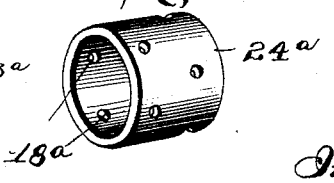

Figure 1 is a side elevation of a complete sash-pulley. Fig. 2 is an elevation of the device shown in Fig. 1, one of the side plates being removed. Fig. 3 is an elevation of the pulley or wheel member, one of its parts being removed, the axle, sleeve, and rollers being shown in section. Fig. 4 is a diametrical vertical section of the pulley on the indicated line 4 4 of Fig. 1. Fig. 5 is a detail perspective of an axle employed in the device. Fig. 6 is a detail perspective of a sleeve employed in the device. Fig. 7 is a detail perspective of a roller employed in the device. Figs. 1 to 7, inclusive, illustrate the preferred form of my device. Fig. 8 is a side elevation of a complete sash-pulley. Fig. 9 is an elevation of the device shown in Fig. 8, one of the side plates being removed. Fig. 10 is a diametrical vertical section of the device on the indicated line 10 10 of Fig. 8. Fig. 11 is an elevation of the wheel member, one of its parts being removed and the axle being shown in section. Fig. 12 is a detail perspective of the axle. Fig. 13 is a detail perspective of a sleeve. Figs. 8, 9, 10, 11, 12, and 13 illustrate a modified construction of my production. Fig. 14 is a vertical section illustrating a further modified construction of my production.

In the construction of the device as shown in Figs. 1 to 7, inclusive, the numerals 10 11 designate counterpart pulley plates or members formed with peripheral flanges which conjunctively constitute a grooved rim to receive a sash-cord. The counterpart pulley-plates 10 11 have their web portions in contact and connected by rivets 12 or other means of fastening. I speak of other means of fastening for the reason that removable rivets, such as are illustrated, may be employed, or in lieu thereof a portion of one plate may be extended through and riveted upon the web of the other plate to the end of producing what is now common in this art—namely, an integral hollow rivet. The counterpart pulley-plates 10 11 have their interior portions expanded in opposite directions to the end that when the plates are mounted in juxtaposition, as shown, a chamber 13 is produced within and surrounded by the web portions of the plates. Apertures are formed in the central portions of the counterpart pulley-plates 10 11, and the margins of said apertures are expanded or turned outward to the end of forming flanges 14 15 within and surrounded by the expanded portions forming the chamber 13 and in longitudinal alinement with each other. The annular flanges 14 15 are of the same diameter and are of a length to produce a bearing-surface preferably longer than the thickness of the pulley at its rim. An annular cylindrical open-ended axle 16 is provided and is positioned within the annular flanges 14 15 of the pulley. The axle 16 is of somewhat less diameter than the annular flanges 14 15, and rollers 17 (in this instance sixteen in number) are mounted in an annular row between said flanges and the axle. The axle 16 may be provided with radial apertures or ports 18. Side plates 19 20 are provided and formed of sheet metal. The side plates 19 20 are formed with inturned end portions adapted to contact with each other and produce a casing to receive the pulley. Each of the side plates 19 20 is formed with a depressed and flattened portion 21, surrounding the center thereof, and each of the flattened depressed portions is apertured centrally. When the side plates 19 20 are positioned in contact with each other, the depressed flattened central portions 21 thereof contact on opposite sides with or are in close juxtaposition to the ends of the annular flanges 14 15 and the ends of the rollers 17. Each of the depressed flattened central portions 21 of the side plates 19 20 is formed with two notches to receive lugs or extensions 22 23 on opposite end portions of the axle 16, which lugs or extensions are upset, riveted, or clenched against said flattened central portions and serve to connect the side plates in such manner as to retain the pulley and rollers in desired relation to the side plates and to the axle. A sleeve 24 or open-ended cylinder, preferably made of sheet metal or tubing, is mounted within and fits snugly to the interior of the axle 16. Lugs or extensions 25 26 on each of the flattened central portions 21 of the side-plates 19 20 are bent inward in alternation with the extensions or lugs 22 23 of the axle into juxtaposition with the end portions of the sleeve 24. It is the function of the lugs 25 26 to retain the sleeve 24 in the axle and supplement the lugs or extensions 22 23 in connecting the side plates and axle and preventing rotary movement of the axle relative to the side plates. Each of the side plates 19 20 is formed with apertures 27 28, adapted to receive hooks or ears 29 30 on a face-plate 31 and connect said face-plate to the side plates. The face-plate 31 is of common and well-known construction, having been described in a previous patent to me, and serves to provide a finish for the sash-pulley in contact with the jamb of a window-casing. The face-plate 31 is provided with an opening 32, through which the pulley projects forwardly from the face of the jamb of a window-casing. The chamber or annular space 13 between the inner portions of the counterpart pulley-plates 10 11 may be filled with lubricating material, such as hard oil or grease, before the rollers, axle, and sleeve, are assembled, and when in use such lubricant will feed directly to the rollers 17 and lubricate said rollers and the bearing between the rollers and axle and between the rollers and annular flanges 14 15 indefinitely, or lubricant may be supplied to the ports or apertures 18 of the axle 16 before the parts are assembled and be confined therein by the sleeve or cylinder 24, such lubricant feeding centrifugally to the rollers 17 and lubricating the bearing between said rollers and the axle and also between said rollers and the annular flanges 14 15. It is to be understood that there is freedom of movement between the ends of the annular flanges 14 15 and the inner surfaces of the depressed flattened portions 21 of the side plates, and there also is freedom of movement between the ends of the rollers 17 and said flattened depressed portions of the side plates, to the end that the parts when assembled may move relative to each other with a minimum of friction. It will be observed that the bearing-surface produced by the annular flanges 14 15 on the row of rollers 17 is of greater length than the thickness of the rim of the pulley, thus limiting and minimizing lateral oscillation of the pulley on its bearing and tending to stable revolution therein.

In the construction as illustrated in Figs. 10 to 13, inclusive, the numerals $10^a$ $11^a$ designate counterpart pulley-plates formed with webs connected by rivets or other means of fastening and having their peripheral portions expanded laterally to produce in conjunction a grooved rim for the reception of a sash-cord, and also having their inner portions expanded laterally to produce in conjunction a chamber $13^a$ and annular flanges $14^a$ $15^a$. An axle $16^a$ is provided and formed with lugs or extensions $22^a$ $23^a$ on its end portions adapted to be received in notches in flattened depressed central portions $21^a$ of side plates $19^a$ $20^a$ and be riveted thereto. Lugs $25^a$ $26^a$ on the flattened depressed central portions $21^a$ of the side plates alternate with the extensions or lugs $22^a$ $23^a$ of the axle and are bent within the axle and serve to limit rotary movement thereof relative to the side plates. A sleeve $24^a$ is provided and interposed between the annular flanges $14^a$ $15^a$ and the outer surface of the axle $16^a$. The sleeve $24^a$ preferably is apertured or perforated to provide communication between the chamber $13^a$ and the outer surface of the axle $16^a$. The sleeve $24^a$ is fitted snugly to the inner surface of the annular flanges $14^a$ $15^a$, and the inner surface of said sleeve constitutes the bearing upon the outer surface of the axle. The device also is provided with a face-plate $31^a$, identical in construction, and means of fastening to the side plates with that described in connection with Figs. 1 to 7, inclusive. The chamber $13^a$ may be supplied with lubricant, such as hard oil, which will feed centripetally through ports, apertures, or perforations $18^a$ in the sleeve $24^a$ to the outer surface of the axle $16^a$. It will be observed that the axle $16^a$ is of relatively large diameter, and yet the quantity of material contained therein—or, in other words, the weight of said axle—is little or no greater than would be the weight of a solid axle of materially and considerably less diameter. By reason of the relatively large diameter of the axle and of the sleeve 24ª, revolving thereon, the wearing-surface between said sleeve and axle is relatively large and correspondingly frictionless when lubricated, in that the contact between said axle and sleeve is distributed over a large area, as contradistinguished to the conditions pertaining in the employment of a relatively small axle. It also will be observed that through the use of a relatively large axle and sleeve revolving thereon the strength of the axle or its ability to support a heavy sash is materially increased relative to what would be the case if a small axle was employed.

In Fig. 14 I illustrate an axle 16ᵇ, in which is mounted a quantity of waste or vehicle for lubricant, disks or plates 32 33 being mounted in said axle in confining contact with the waste and held against movement outwardly by the inturned lugs 25ᵇ 26ᵇ. In the construction as illustrated in Fig. 14 provision is made for feeding lubricant centrifugally through ports or apertures 18ᵇ in the axle 16ᵇ. When the device is constructed as shown in Fig. 14, the ports or apertures 18ª may be omitted from the sleeve 24ª, since lubricant would not be employed in the chamber surrounding said sleeve. The sleeve 24ª may be omitted and the annular flanges 14ª 15ª provide direct contact on the exterior of the axle 16ª.

I claim as my invention—

1. A sash-pulley, comprising a casing, an axle therein, a pulley mounted for revolution on said axle, and rollers interposed between said axle and pulley, which pulley is formed with an expanded interior portion projecting outwardly from the median line thereof and forming a bearing on said rollers and an expanded rim portion.

2. A sash-pulley, comprising a casing, an axle therein, a gang of rollers mounted in an annular row around said axle, a pulley mounted for revolution on said gang of rollers, said axle formed with transverse ports or perforations, and a sleeve mounted within said axle.

3. A sash-pulley, comprising a casing, a hollow axle mounted in said casing, a gang of rollers mounted on said hollow axle, and a pulley mounted for revolution on said gang of rollers, which pulley is formed of counterpart plates rigidly connected, each plate formed with an annular flange on its inner portion constituting a bearing on said gang of rollers.

4. In a sash-pulley, a frame, a wheel, a hollow perforated tube within said wheel and acting as a bearing therefor, lubricant between said tube and wheel, and an axle within said tube and joining the sides of the frame.

5. In a sash-pulley, a frame, a hollow axle having ends cut away to form one or more projections, the shorter portion of said axle contacting with the inner sides of the frame to space them apart, and the projections passing through the frame to hold it together, and a wheel mounted for revolution on said axle.

6. In a sash-pulley, a frame, an axle nonrotatably mounted in said frame, a wheel mounted for revolution around said axle and formed of counterpart plates shaped to provide an interior chamber and containing lubricant in said chamber, and a perforated bushing between said wheel and axle and adapted to distribute said lubricant.

Signed by me at Ottumwa, Iowa, this 21st day of November, 1903.

ALLEN JOHNSTON.

Witnesses:
 LEO E. STEVENS,
 FRANK BEACH.